United States Patent
Agulnik et al.

(10) Patent No.: US 9,591,133 B2
(45) Date of Patent: Mar. 7, 2017

(54) METHOD AND APPARATUS FOR DETERMINING A COMMUNICATION TARGET AND FACILITATING COMMUNICATIONS BASED ON AN OBJECT DESCRIPTOR

(75) Inventors: Anatoly Agulnik, Deerfield, IL (US); Donald G. Newberg, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 613 days.

(21) Appl. No.: 12/649,917

(22) Filed: Dec. 30, 2009

(65) Prior Publication Data

US 2011/0161399 A1 Jun. 30, 2011

(51) Int. Cl.
| | |
|---|---|
| *G06F 15/16* | (2006.01) |
| *H04M 3/493* | (2006.01) |
| *H04M 7/00* | (2006.01) |
| *H04W 76/00* | (2009.01) |
| *H04L 29/06* | (2006.01) |

(52) U.S. Cl.
CPC ...... *H04M 3/4935* (2013.01); *H04L 65/1006* (2013.01); *H04L 65/4038* (2013.01); *H04M 7/0075* (2013.01); *H04W 76/005* (2013.01); *H04M 2203/154* (2013.01)

(58) Field of Classification Search
CPC ..................................................... H04M 3/56
USPC ......................................... 709/203; 370/390
See application file for complete search history.

(56) References Cited

U.S. PATENT DOCUMENTS

| | | | |
|---|---|---|---|
| 5,014,345 A | 5/1991 | Comroe et al. |
| 5,613,201 A | 3/1997 | Alford et al. |
| 7,298,734 B2 | 11/2007 | Nabkel et al. |
| 7,314,178 B2 | 1/2008 | Rines et al. |
| 7,367,497 B1 | 5/2008 | Hill |
| 7,404,148 B2 | 7/2008 | Lincke et al. |
| 7,407,107 B2 | 8/2008 | Engeström et al. |
| 7,414,981 B2 | 8/2008 | Jaramillo et al. |
| 7,454,542 B2 | 11/2008 | Illowsky et al. |
| 2005/0231648 A1 | 10/2005 | Kitamura et al. |

(Continued)

FOREIGN PATENT DOCUMENTS

| | | |
|---|---|---|
| DE | 10061554 A1 | 6/2002 |
| WO | 0056047 A2 | 9/2000 |

(Continued)

OTHER PUBLICATIONS

Mock et al; "Creating a Dynamic Group Call Through Similarity Between Images"; World International Property Organization (WIPO) Publication W0 2008/027682 A2; pp. 1-17.*

(Continued)

*Primary Examiner* — Glenford Madamba

(57) ABSTRACT

A server performs a method for determining a communication target and facilitating communications with the target based on an object descriptor. The method includes the server receiving, from a requestor in a communication system, an object descriptor for an object, a description of a relationship between the object and a target in the communication system, and a request for a communication action with the target. The server then determines the target using the object descriptor and the relationship between the object and the target and facilitates the communication action with the target.

10 Claims, 3 Drawing Sheets

(56) References Cited

U.S. PATENT DOCUMENTS

| | | | |
|---|---|---|---|
| 2006/0256959 | A1 | 11/2006 | Hymes |
| 2007/0019616 | A1 | 1/2007 | Rantapushka et al. |
| 2007/0024527 | A1 | 2/2007 | Heikkinen et al. |
| 2007/0242670 | A1* | 10/2007 | Simonson et al. ............ 370/390 |
| 2008/0051033 | A1 | 2/2008 | Hymes |
| 2008/0055395 | A1 | 3/2008 | Mock et al. |
| 2008/0144082 | A1* | 6/2008 | Kister .......................... 358/1.15 |
| 2010/0248692 | A1 | 9/2010 | Keller et al. |

FOREIGN PATENT DOCUMENTS

| | | |
|---|---|---|
| WO | 2006110803 A2 | 10/2006 |
| WO | 2007062436 A2 | 5/2007 |
| WO | 2007021586 A3 | 7/2007 |
| WO | 2008027682 A3 | 11/2008 |
| WO | 2010140907 A1 | 12/2010 |

OTHER PUBLICATIONS

PCT International Search Report Dated Apr. 28, 2011 for Counterpart Application.

International Preliminary Report on Patentability for International Application No. PCT/US2010/059075 mailed on Jul. 12, 2012.

Danninger, M., et al., "The Connector—Facilitating Context-aware Communication," ICMI'05, Proceedings of the 7th International Conference on Multimodal Interfaces, pp. 69-75, Oct. 4-6, 2005.

Lim, J. H., et al. "Scene Recognition with Camera Phones for Tourist Information Access," IEEE International Conference on Multimedia and Expo, pp. 100-103, Jul. 2-5, 2007.

Shell, J. S., et al., "ECSGlasses and EyePliances: Using Attention to Open Sociable Windows of Interaction," pp. 93-100, 2004.

"Hierarchical Social Communication," Technology Datasheet, pp. 2, 2007.

Office Action for counterpart Korean Patent Application No. 1020127019901 mailed Nov. 28, 2013.

Office Action for counterpart Russian Patent Application No. 2012132396 mailed Jul. 12, 2013.

Office Action for counterpart Russian Patent Application No. 2012132396 mailed Dec. 6, 2013.

Patent Examination Report for counterpart Australian Patent Application No. 2010343285 mailed Jul. 18, 2013.

Second Patent Examination Report for counterpart Australian Patent Application No. 2010343285 mailed Nov. 28, 2013.

* cited by examiner

METHOD AND APPARATUS FOR DETERMINING A COMMUNICATION TARGET AND FACILITATING COMMUNICATIONS BASED ON AN OBJECT DESCRIPTOR

TECHNICAL FIELD

The technical field relates generally to communication systems and more particularly to determining a communication target and facilitating communications with the target based on an object descriptor and a relationship between the object and the target.

BACKGROUND

In dynamic situations (incidents), public safety officers may need to communicate with officers and groups (targets) that are not part of their day-to-day team. As such, these targets will not be programmed into an officer's radio or address book, and may not even be readily identifiable to the officer desiring such communications. However, objects such as police cars, command vans, etc., associated with and/or in the vicinity of the targets usually have some noticeable indicators such as color patterns, text signs, symbols, and the like, that represent directly or indirectly their agency and identity within the agency and that is readily describable.

Thus, there exists a need for a method and apparatus for using an object descriptor and a relationship between the object and a target to determine the target and facilitate communications with the target.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
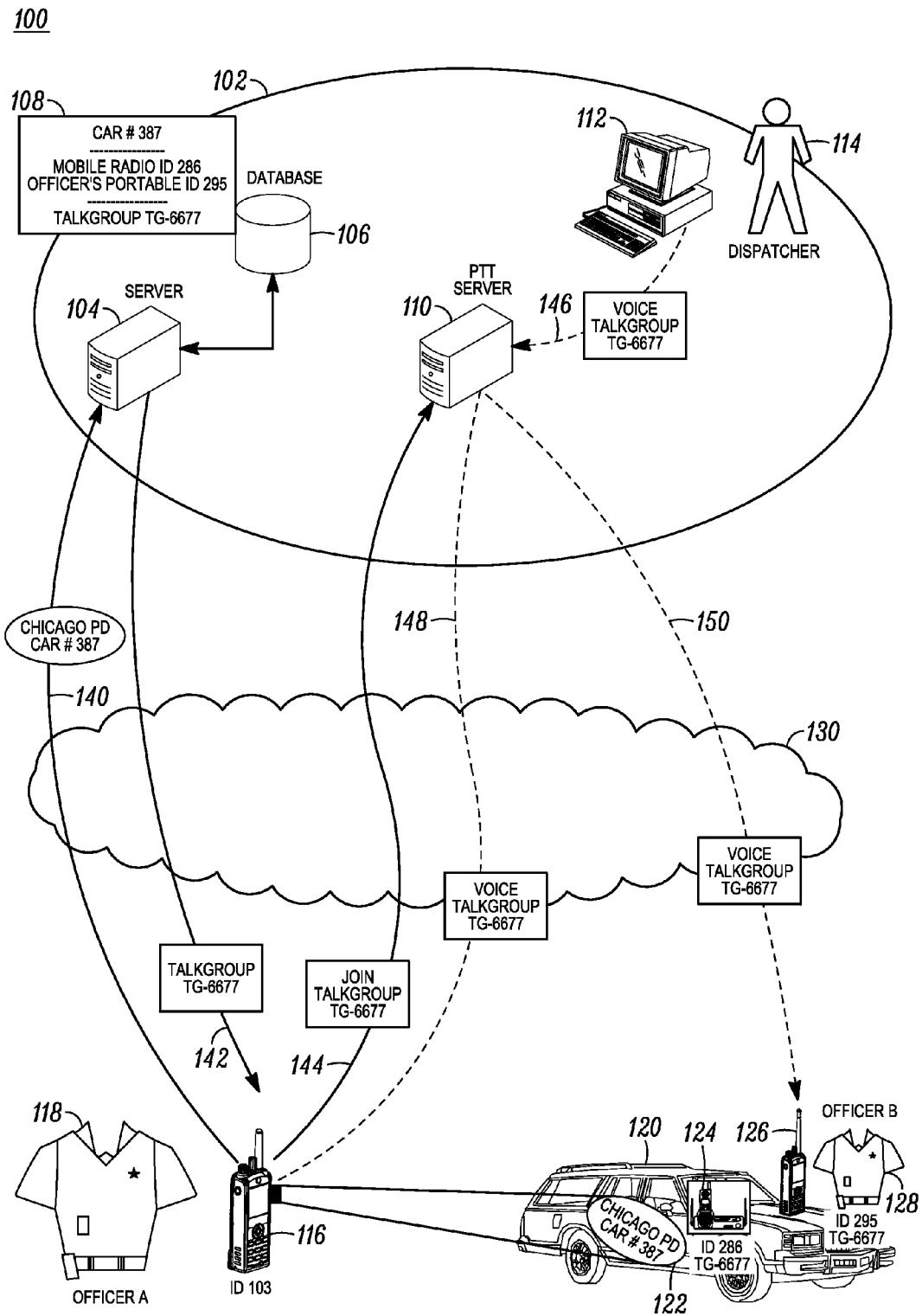
FIG. 1 is a system diagram of a communication system overlaid with a signaling flow for determining a communication target based on an object descriptor in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a server performs a method for determining a communication target and facilitating communications based on an object descriptor. The method includes the server: receiving, from a requestor in a communication system, an object descriptor for an object, a description of a relationship between the object and a target in the communication system, and a request for a communication action with the target; and determining the target using the object descriptor and the relationship between the object and the target, e.g., by via a multi-step process. Upon determining the target, the server further facilitates the communication action with the target by: establishing a communication session between the requestor and the target; affiliating the requestor with the target (when the target is a communications group); or sending the requestor data (e.g., an identifier for the target) to establish a communication session with the target, etc.

A benefit of the teachings herein is that by using an object descriptor, a relationship between the object and a communication target of interest, and static and dynamic data available to the server during an incident, the server can readily determine the target and facilitate communications with the target. Those skilled in the art will realize that the above recognized advantages and other advantages described herein are merely illustrative and are not meant to be a complete rendering of all of the advantages of the various embodiments.

Figure 2:
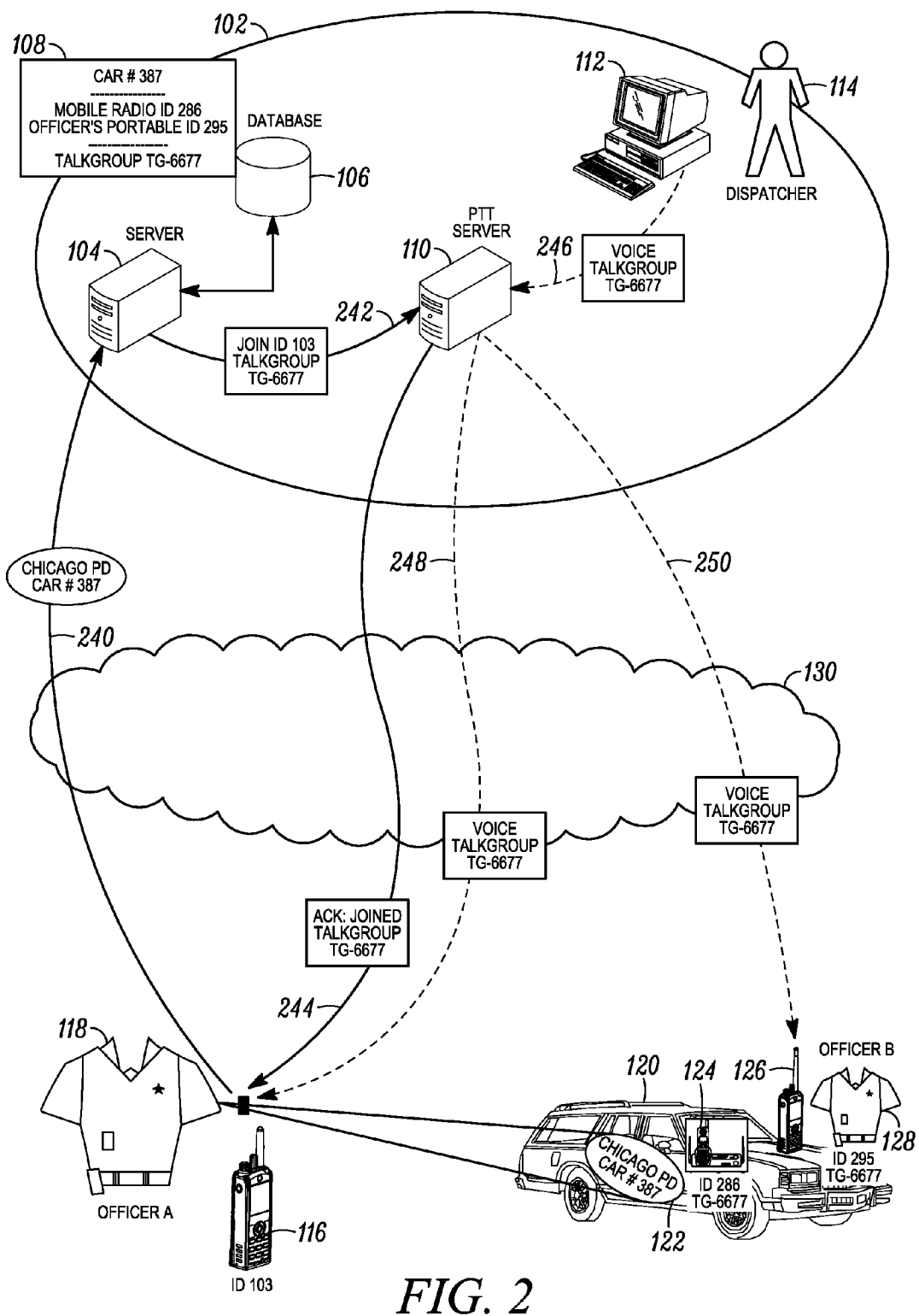
FIG. 2 is a system diagram of a communication system overlaid with a signaling flow for determining a communication target based on an object descriptor in accordance with another embodiment.
Figure 3:
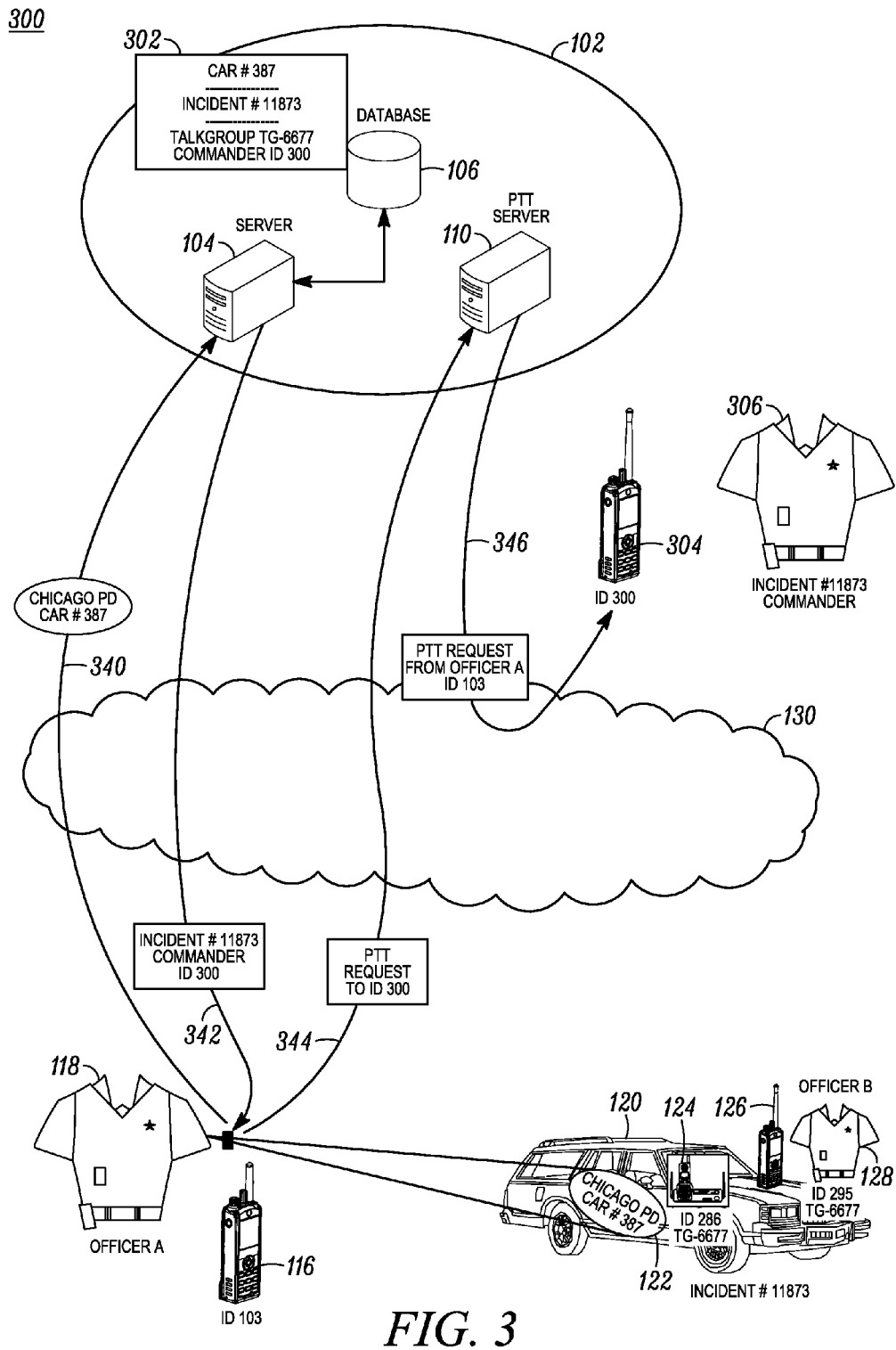
FIG. 3 is a system diagram of a communication system overlaid with a signaling flow for determining a communication target based on an object descriptor in accordance with yet another embodiment.

Referring now to the drawings, and in particular FIG. 1, a system diagram of a communication system overlaid with a signaling flow for determining a communication target based on an object descriptor in accordance with some embodiments is shown and indicated generally at 100. FIGS. 2 and 3, respectively, illustrate communication systems 200 and 300 that contain some identical entities as those included in system 100, and the description of such entities is not repeated for the sake of brevity. Those skilled in the art will recognize and appreciate that the specifics of the examples included herein are merely illustrative of some embodiments and that the teachings set forth herein are applicable in a variety of alternative settings. For example, since the teachings described do not depend on the particular type of messaging or call control protocol used or system implementation, they can be applied to any type of standard or proprietary messaging and call control protocol or system implementation including public safety, commercial, private, or public system implementations or a combination thereof.

In this illustrative implementation, system 100 comprises a public safety system 102 that facilitates wireless communications between a plurality of officers or responders to an incident (e.g., officers A (118) and B (128)). Officers A and B uses mobile devices 116, 124, 126 to communicate with each other and with the public safety system 102 via a wireless network 130. Although not shown, wireless network 102 may include a number of infrastructure devices commonly referred to as, but not limited to, bridges, switches, controllers, base station controllers, repeaters, base stations, base radios, base transceiver stations, access points, routers or any other type of infrastructure equipment facilitating communications between entities in a wireless or wired environment.

The mobile devices 116, 124, 126 are also referred to in the art as communication devices, client entities, access devices, access terminals, user equipment, mobile stations, subscriber units, and the like, and can be any standard communication device such as radios, mobile phones, two-way radios, cell phones, personal digital assistants (PDAs), or any other device capable of enabling communications between users in a wireless environment.

Public safety system 102 includes a server 104 coupled to a database 106, a push-to-talk (PTT) server 110, and a computer aided dispatch (CAD) system 112 operated by a dispatcher 114. In an embodiment, system 102 is a Telecommunications Industry Association (TIA) APCO Project 25 compliant communication system that enables push-to-talk services, as described in TIA 102-series documents, using TIA 102-AA series of call control standards as the call control protocol. In an alternative embodiment, system 102 enables push-to-talk services using a Push to talk over Cellular (PoC) technology such as one described in technical specifications published by Open Mobile Alliance (OMA), which uses Session Initiation Protocol (SIP) defined in Internet Engineering Task Force (IETF) Request for Comments (RFC) 3261 dated June 2002. However, as mentioned above, the particular system implementation does not limit the scope of the teachings herein. Moreover, server 104, PTT server 110, and CAD system 112 are shown in FIG. 1 as separate physical entities. However, in an alternative embodiment, the server 104 can share a common hardware and software and/or firmware platform with one or both of the PTT server 110 and the CAD system 112, PTT server 110 uses any suitable call control signaling protocol (examples of which are provided above) to initiate, modify, and terminate communication sessions, including but not limited to group calls, wherein various media (e.g., voice, data, video, etc.) is exchanged during the communication session. CAD 112 contains a suite of software packages used by personnel such as emergency communications dispatchers 114, call-takers, and 911 operators in centralized, public-safety call centers, field personnel utilizing mobile data terminals (MDTs) or mobile data computers (MDCs), and the like, to initiate public safety calls for service, to dispatch responding resources (e.g., responders sent to the emergency scene and their equipment), and to maintain the status of responding resources in the field and system state data such as such as whether an incident exists and group membership, which can be used by the server 104 to determine a target for communications in accordance with the teachings herein.

Database 106 comprises a logical construct that maintains and/or accesses data, e.g., data 108, which facilitates the determination by the server 104 of a communication target in accordance with the teachings herein. As such, database 106 may be implemented in one or more physical devices accessible to the server 104 including, but not limited to, the PTT server 110, the CAD system, 112, the server 104, elements within the network 130, or a combination thereof. In another embodiment, database 106 comprises links and references to other system entities, e.g., the CAD system 112 or an APCO-25 compliant zone controller.

Data stored in database 112 includes, for example: subscriber and responder data, such as unique identifiers that correspond to users and their mobile devices; talkgroup identifiers; identifiers for responder resources and equipment such as cars and vans (e.g., vehicle numbers); fleet numbers; CAD data (e.g., system state, incident type, incident level, responder roles in an incident such as incident commander, user priority to receive media); user roles within a public safety agency, such as chief of police or fire marshal; user registration and group affiliation data; mappings of users to particular mobile devices and/or vehicles; or any other data, whether statically maintained (such as certain static communications groups or talkgroups, user role, mapping of users to particular vehicles), i.e., "static data", or dynamically determined (e.g., ad hoc groups and incident commander assignments), i.e., "dynamic" data.

As used herein, "static data" means data that is substantially fixed and changes (if at all) very infrequently; and "dynamic data" is data that regularly, periodically, and/or dynamically changes based on some factor or parameter such as existence and status of incident or based on a periodic schedule. Server 104, upon extracting and obtaining static and/or dynamic data from the database 106, uses this data to implement methods in accordance with the teachings herein to determine a communication target and to facilitate communications with the target based on an object descriptor and a relation ship between the object (that is the subject of the descriptor) and the target.

In general, the server 104, the PTT server 110, the CAD system 112, infrastructure devices in network 130 (not shown), and the mobile devices 116, 124, 126 are each implemented using (although not shown) a memory, one or more network interfaces, and a processing device that are operatively coupled, and which when programmed form the means for these system elements to implement their desired functionality, for example as illustrated by reference to signaling flows incorporated into FIGS. 1 to 3. The network interfaces are used for passing signaling (e.g., messages, packets, datagrams, frames, superframes, and the like) between the elements of the system 100. The implementation of the network interface in any particular element depends on the particular type of network, i.e., wired and/or wireless, to which the element is connected.

For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the PTT server 110, the CAD system 112, infrastructure devices in network 130, and the mobile devices 116, 124, 126 may be programmed with software or firmware logic or code for performing signaling such as that included in signaling flows illustrated in FIGS. 1 to 3; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a general description of the methodology, in accordance with the teachings herein, for determining a target based on an object descriptor and a relationship between the object and the target and for facilitating communications with the target. When a user wants to communicate with some target (e.g., another user, group, device, etc.) related to or associated with an object (e.g., a police car, a command van, an officer's uniform, etc., the user uses her device (called herein a "requestor") to construct an object descriptor based on any one or a combination of visual indicators on the object. Such visual indicators can be in the form of, but are not limited to, color patterns, text, numbers, symbols, etc.

In one illustrative implementation, the descriptor is a visual descriptor; for instance, the user points a camera enabled radio towards an object of interest (e.g., a police car), focuses the camera on the car's indicator and makes one or more photo shots. In another illustrative implementation, the descriptor is a voice or audio descriptor, wherein the user verbally describes the object's one or more indicators using one of his mobile devices. In yet another implementation, the descriptor is a text descriptor comprising, for example, an alphanumeric identifier on or associated with the object. In this case, the user types definitions and values of the object's one or more indicators or selects them from a pre-loaded menu.

Moreover, the user selects or inputs a type of desired communications (termed a desired "communication action") and a relationship of the communication target to the object, e.g., the officer driving the vehicle with a certain vehicle alphanumeric indicator. Then the requestor forwards the user's selections along with the object descriptor to the communication system, e.g., the server 104. Examples of communication types or communication actions with the target and relationships between the object and the target include: a request to join the same talkgroup (target) as officer(s) that are in a police car (object); a request to initiate a call with the supervisor or shift commander (target) of officer(s) that are in a car (object); a request to join a talkgroup (target) associated with the incident that the officer(s) in the car (object) are dispatched for; and a request to initiate a call with the incident commander (target) of the incident that a police car (object) is dispatched for.

Using databases and system state at its disposal, the server 104 derives an identifier for the target of the communication based on the relationship to the object that is defined by the provided object descriptor. This may involve performing a multi-step process. For example: the server 104 derives an identity of an officer in a car; from that the server 104 derives an identity of the identified officer's portable radio; from that the server 104 derives an identity of a talkgroup to which the radio is currently affiliated. In another example implementation: the server 104 derives an identity of an officer in a car; from that the server 104 derives an incident to which the identified officer is assigned; from that the server 104 derives a commander of the incident. Then the server 104 initiates the requested communication action or provides the requestor with necessary information in order to complete the requested communication action, for example, by automatically affiliating the user/requestor to a talkgroup of interest, initiating a private call between the user and the commander of an incident, etc.

Accordingly, using the disclosed teachings, an object descriptor (of any kind) can effectively be used as an "address" for a communication target based on the target's relationship to the object. The determination of the target is achieved by querying back end databases that store static data and dynamic mappings between users, equipment, vehicles, and communications groups that are created and maintained by the system. The specific queries and their sequence depend on the requested relationship of the desired communication target to the object. The teachings herein are illustrated by reference to some illustrative use cases described by reference to FIGS. 1 to 3.

More particularly, FIG. 1 illustrates a use case, wherein the target is a communications group associated with a user of an object, and the server 104 facilitates a communication action with the target by providing the requestor with data to enable the requestor to establish a communication session with the group. FIG. 2 illustrates a use case, wherein the target is a communications group associated with a user of an object, and the server 104 facilitates a communication action with the target by establishing a communication session with the group. FIG. 3 illustrates a use case, wherein the target is a communication device of a user associated with an object, and the server 104 facilitates a communication action with the target by providing the requestor with data to enable the requestor to establish a communication session with the communication device.

Turning first to the use case shown in FIG. 1, Officer A sees a police vehicle 120 (object) passing by and wants to participate in the same talkgroup (target) calls as the officers (e.g., Officer B) using the car. The police vehicle has a large sign with the car's tag number 122 (indicator), e.g., Chicago PD car number 387. Officer A points his radio's camera towards the car, zooms in on the car's identification tag 122 and presses a button (e.g., a PTT button); and the camera makes a digital picture of the car's identification tag 122 (visual descriptor). The radio (requestor) builds a request to identify (communication action) any talkgroups that the vehicle's mobile radio (e.g., mobile 124) and/or the portable of the officers using the car (e.g., portable 126) are currently affiliated with (relationship between object and target). It then sends (140) the request with the visual descriptor to the server 104 using any standard or proprietary messaging protocol.

Upon receiving the request, the server 104 extracts the car's identification or identifier (ID) number from the visual descriptor or finds a police car with the best match for the visual descriptor and queries its database 106 to obtain/ extract data 108 to map the car's ID number 387 to the car's mobile radio ID (e.g., ID 286) or an ID of the portable radio (e.g., ID 295) used by the officer in the car. Either ID is then further used to extract a talkgroup ID (e.g., TG-6677) that is currently associated with the mobile/portable radio. This talkgroup ID is then sent (142) to Officer A's portable 116, again using any standard or proprietary messaging protocol.

Upon Officer A's portable device 116 receiving the talkgroup ID of interest, it joins TG-6677 by sending a "join" message 144 (that includes talkgroup ID TG-6677) to the PTT server 110, for instance using a SIP messaging sequence or an APCO 25 compliant call control protocol. The join message is used by the requestor to establish communications with the target talkgroup. Thus, when the dispatcher 114 initiates (146) a voice group call to talkgroup TG-6677, e.g., using a SIP messaging sequence or an APCO 25 compliant call control protocol, Officer A is brought into any group calls and receives (148) the media received (150)

by the other group members. Alternatively, Officer A or any other users having devices affiliated with TG-6677 can initiate calls to this group.

The use case illustrated by reference to FIG. 2 is similar to the use case illustrated by reference to FIG. 1, except that upon receiving a request (that is identically derived as the request 140 of FIG. 1) via a message 240, the server 104 joins the requestor to the talkgroup (having ID TG-6677) to establish a communication session with the target talkgroup. This is accomplished by the server 104 sending (242) a join message to the PTT server 110 on behalf of portable device 116, which contains talkgroup ID TG-6677 and an ID for portable device 116, e.g., ID 103; wherein portable device 116, receives an acknowledgement (244) that it was joined to the talkgroup. Then, just as with the use case illustrated by reference to FIG. 1, when the dispatcher 114 initiates (246) a voice group call to talkgroup TG-6677 (or when any member of the talkgroup initiates such as call), Officer A is brought into any group calls and receives (248) the media received (250) by the other group members.

Illustrated in FIG. 3, Officer A sees the police vehicle 120 (object) passing by and wants to communicate with the commander (target) of the incident team that the vehicle and its personal (e.g., Officer B) are assigned to. In this illustrative implementation, Officer A selects a talk-to-incident-commander option (communication action) on his portable 116, points the radio towards the police car, and presses a button; and the camera makes a digital picture of the car's identification tag 122. The radio builds a request to communicate with the commander of the incident team to which the vehicle 120 and its personal are assigned (communication action and relationship between the target and the object). The radio 116 then sends (340) the request with the car's ID 387 to the server 104 using any standard or proprietary messaging protocol.

Upon receiving the request, the server 104 extracts the car's ID number from the visual descriptor or finds a police car with the best match for the visual descriptor and queries its database 106 to obtain/extract data 302 to retrieve incident information based on the car's identity. The incident information includes an incident ID number 11873, the talkgroup ID TG-6677, an ID for an incident commander 306, an ID 300 for a portable device 304 used by the incident commander, etc. This incident information (or part of it, which in this case includes at least the incident ID 11873 and the portable ID 300) is sent (342) to the requesting radio 116. Upon receiving the incident information, Officer A's portable 116 initiates a private call to the incident commander using the provided ID 300 of his portable device by sending any suitable message 344 to the PTT server 110. For example, message 344 is a PTT request to ID 300 from an ID 103 of portable 116. The PTT server validates the request and sets up (346) a private call between Officer A and the incident commander's portables 116 and 304. Messages associated with 344 and 346 are compliant with any standard or proprietary call control protocol.

Using a similar methodology as that described by reference to FIG. 3, where Officer A wants an identity (communication action) of the officer (Officer B) (target) who is currently out of the car and cannot be seen, for example, because Officer B is pursuing a suspect on foot. Once the object (car) has been identified based on the object descriptor, server 104 further performs a mapping to retrieve the identity of the officer who is associated with this car. This may be useful when the officer arrives to the incident scene to help in an ongoing foot chase.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for determining a communication target based on an object descriptor described herein. The non-processor circuits may include, but are not limited to, a radio receiver, a radio transmitter, signal drivers, clock circuits, power source circuits, and user input devices. As such, these functions may be interpreted as steps of a method to perform the determining of a communication target based on an object descriptor described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining a communication target and facilitating communications with the target based on an image, the method comprising:
   at a server:
   receiving, from a requestor in a communication system, an image of an object, a description of a relationship between the object and a talk group in the communication system, and a request to establish communications with the talkgroup, wherein the talkgroup comprises a group of radios;
   determining the talkgroup based on the object and the relationship between the object and the talkgroup; and
   establishing a communication session between the requestor and the talkgroup.

2. The method of claim 1 further comprising determining an identifier for the talkgroup, wherein establishing the communications with the talkgroup comprises sending the identifier to the requestor to enable the requestor to establish a communication session with the talkgroup.

3. The method of claim 1, wherein determining the talkgroup comprises performing a multi-step process to identify the talkgroup based on the relationship between the object and the talkgroup.

4. The method of claim 1, wherein determining the talkgroup comprises extracting static data.

5. The method of claim 1, wherein determining the talkgroup comprises obtaining dynamic data.

6. The method of claim 1, wherein the talkgroup is a user associated with the object, and the communication action comprises a communication session with the user.

7. The method of claim 1, wherein the talkgroup is a group associated with a user of the object, and the communication action comprises a communication with the group.

8. The method of claim 1, wherein the talkgroup is determined based on a state of the communication system.

9. A device for determining a communication talkgroup and facilitating communications with the talkgroup based on an image, the device comprising:
   an interface and a processing device operatively coupled for:
   receiving, from a requestor in a communication system, an image of an object, a description of a relationship between the object and a talk group in the communication system, and a request to establish communications with the talkgroup, wherein the talkgroup comprises a group of radios;
   determining the talkgroup based on the object and the relationship between the object and the talkgroup; and
   establishing a communication session between the requestor and the talkgroup.

10. A non-transitory computer-readable storage element having computer readable code stored thereon for programming a computer to perform a method for determining a communication talkgroup and facilitating communications with the talkgroup based on an image, the method comprising:
   receiving, from a requestor in a communication system, an image of an object, a description of a relationship between the object and the talk group in the communication system, and a request to establish communications with the talkgroup, wherein the talkgroup comprises a group of radios;
   determining the talkgroup based on the object and the relationship between the object and the talkgroup; and
   establishing a communication session between the requestor and the talkgroup.

* * * * *